May 7, 1946.   C. H. CORDIE ET AL   2,399,987
FREE-FLOWING AMMONIUM NITRATE COMPOSITION
Filed April 13, 1944

CHARGE

1. AMMONIUM NITRATE IS FORMED INTO GRAINS BY CRYSTALLIZING AN AMMONIUM NITRATE MELT CONTAINING FROM 0.5-4% OF WATER.
2. COATING AGENT IS ADDED AT A TEMPERATURE OF 200-230°F.
3. KIESELGUHR IS ADDED AT A TEMPERATURE OF 120-190°F.

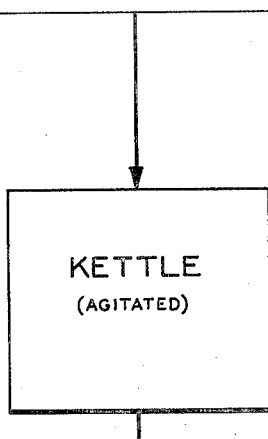

KETTLE
(AGITATED)

DISCHARGE

4. COATED GRANULAR AMMONIUM NITRATE HAVING KIESELGUHR INTIMATELY MIXED THEREWITH.

CORNELL H. CORDIE
ROBERT W. LAWRENCE
*INVENTORS*

BY *Claudius B Hollabaugh*

ATTORNEY

Patented May 7, 1946

2,399,987

UNITED STATES PATENT OFFICE 2,399,987

FREE-FLOWING AMMONIUM NITRATE COMPOSITION

Cornell H. Cordie and Robert W. Lawrence, Wilmington, Del., assignors to Hercules Powder Company, Wilmington, Del., a corporation of Delaware Application April 13, 1944, Serial No. 530,808

10 Claims. (Cl. 23—103)

This invention relates to fertilizers and more particularly to an ammonium nitrate composition having improved properties with respect to caking or setting and to a method of producing the ammonium nitrate composition.

The value of ammonium nitrate as a fertilizer has long been known. Because of its high nitrogen content and the ready availability of the nitrogen, ammonium nitrate is an ideal material for this purpose. However, a disadvantage in connection with its use is its tendency to cake, or set, under conditions of shipping and storage. High humidity, fluctuating temperature, and increased pressure contribute to this caking or setting effect. In such a condition ammonium nitrate is practically useless as a fertilizer, as it cannot be distributed satisfactorily from a fertilizer distributor.

In the past, attempts have been made to overcome this disadvantage by coating the crystals of ammonium nitrate with waterproofing or moisture-repelling agents, such as paraffin wax, resins, petrolatum, sodium, calcium or zinc soaps, and the like, or mixtures thereof. Other attempts have been made to overcome this disadvantage by the addition of such agents as phosphate rock, superphosphate, clay, kieselguhr, fuller's earth, talc, and the like. However, the treatment of ammonium nitrate with agents heretofore used has resulted in only partial protection against caking or setting. Hence, this tendency toward setting has greatly retarded the use of ammonium nitrate as a plant food.

Now, in accordance with this invention, it has been found that ammonium nitrate having improved properties with respect to caking or setting may be prepared by coating the nitrate with a mixture of a natural resin, paraffin, and petrolatum, and then intimately mixing the coated nitrate with a small proportion of a porous, low-density, water-insoluble inorganic material.

More specifically, the invention concerns an ammonium nitrate composition having improved resistance to caking, said composition being produced by coating granular ammonium nitrate with not more than 4% by weight of a mixture of a natural resin such as rosin, paraffin, and petrolatum; then intimately mixing not more than 10% by weight of porous, low-density, water-insoluble inorganic materials, such as kieselguhr, precipitated magnesium carbonate, precipitated aluminum hydroxide; and then cooling to produce a free-flowing granular mass.

The nature and purpose of the invention have been indicated in a general way, and there now follows a more detailed description of preferred embodiments thereof with reference to the accompanying drawing, which is a composite flowchart and diagrammatic representation of the apparatus employed.

With reference to the drawing, it will be seen that the invention may be carried out according to the following procedure: (1) Ammonium nitrate is formed into grains by crystallizing an ammonium nitrate melt containing from about 0.5 to about 4% of water in an agitated kettle at a conventional graining temperature in the order of 300° F. The kettle is preferably of the type conventionally used for graining ammonium nitrate; that is, one equipped with rotating plows. (2) The coating agent is added to the charge when the temperature of the ammonium nitrate has dropped to a temperature of from about 200 to about 230° F. (3) The finely-divided kieselguhr is intimately mixed with the charge when the temperature of the coated ammonium nitrate has dropped to a temperature of from about 120 to about 190° F. (4) The coated granular ammonium nitrate having the kieselguhr intimately mixed therewith is then discharged, at a temperature of from about 120 to about 190° F. Alternatively, in step (3) the kieselguhr may be applied immediately after the coating, hence at about 10° below the coating temperature.

Examples to show preferred embodiments of the invention are set forth in the following tables. Certain laboratory tests have been devised for evaluating the effectiveness of antisetting agents under conditions simulating actual field conditions. These tests are as follows:

(1) A humidifier test, in which the ammonium nitrate is exposed in an open dish to high humidity (saturated ammonium dihydrogen phosphate solution corresponding to 93% relative humidity); and (2) A humidity-pressure test, in which the ammonium nitrate is placed under a pressure of 3.5 lb. per sq. in. and subjected simultaneously to an atmosphere of 75% relative humidity, thus simulating storage conditions.

Both the degree of set and the dry or wet condition of the samples are expressed in the humidity-pressure tests. Samples "set hard" or "wet" cannot be used satisfactorily in a fertilizer distributor. Samples "slightly set" or "moderately set" and "dry" crumble readily and can be distributed satisfactorily.

TABLE 1

*Ammonium nitrate—resistance to setting under high humidity*

| Coating | Water-insoluble inorganic material | Humidifier test 48 hrs., 75° F. |
|---|---|---|
| None | None | Wet, thick mush. |
| 1% rosin-paraffin | do | Damp, loosely packed. |
| None | 5% kieselguhr | Damp, plastic cake. |
| Do | 5% precipitated aluminum hydroxide. | Do. |
| 1% rosin-paraffin-petrolatum 72-18-10.[1] | None | Do. |
| Do.[1] | 4% kieselguhr | Dry, free-flowing. |
| 1% rosin-paraffin-petrolatum 64-16-20.[1] | do | Do. |
| 1% rosin-paraffin-petrolatum 56-14-30.[1] | do | Do. |
| Do.[1] | 4% precipitated aluminum hydroxide. | Do. |
| 1% rosin-paraffin-petrolatum 40-10-50.[1] | 4% kieselguhr | Do. |
| 2% rosin-paraffin-petrolatum 68-17-15.[1] | 3% kieselguhr | Dry, free-flowing (113 hrs.). |
| 3% rosin-paraffin-petrolatum 72-18-10.[1] | 2% kieselguhr | Do. |

[1] Ratio expressing parts by weight of rosin-paraffin-petrolatum, respectively.

From the data of Table 1, it will be seen that neither the coating alone nor the water-insoluble inorganic material alone gives satisfactory protection. However, with kieselguhr or precipitated aluminum hydroxide, rosin-paraffin-petrolatum coatings confer excellent anticaking properties.

than 10% porous, low-density, water-insoluble inorganic material gave very much improved properties with respect to setting, as contrasted to the ammonium nitrate containing no coating and absorbent, absorbent only, and coating only. In accordance with the invention the coating can be effectively applied in amounts of from about 0.5% up to about 4% by weight of the ammonium nitrate, the preferred range being from about 1% to about 2%. The water-insoluble inorganic material can be effectively applied in amounts of about 1% to about 10% by weight of the ammonium nitrate, the preferred amount being from about 2% to about 6%.

In preparing the coating composition of the invention, natural resins, derivatives of natural resins, or blends thereof, compatible with paraffin and petrolatum, may be used. Resins which have been found preferable are the rosins derived from pine wood, such as FF, I, and M wood rosin. Other pine wood resin derivatives may be utilized, as well as gum, dammar, and mastic, and modified forms thereof compatible with paraffin and petrolatum. The paraffin may be crude-scale wax or a refined grade thereof. Various grades of petrolatum, such as amber, brown, and greenish brown, may be employed. Petrolatum with a drop melting point in the range of 130° to 170° F. is preferred.

Various kinds of porous, low-density, water-insoluble inorganic materials may be used. Kieselguhr, precipitated magnesium carbonate, and

TABLE 2

*Resistance of ammonium nitrate to setting*

| Ammonium nitrate | Rosin-paraffin-petrolatum coating | Water-insoluble inorganic material | Humidity-pressure test |
|---|---|---|---|
| Fine | None | None | Damp, hard set, plastic (72 hrs.). |
| Coarse | do | do | Very damp cake (72 hrs.). |
| Fine | do | 5% kieselguhr | Damp, hard set (72 hrs.). |
| Coarse | do | do | Very damp, slightly set (72 hrs.). |
| Fine | 1% 72-18-10 [1] | None | Wet, moderately set (72 hrs.). |
| Coarse | do.[1] | do | Do. |
| Fine | 1% 56-14-30 [1] | 4% kieselguhr | Dry, slightly set (72 hrs.). |
| Coarse | do.[1] | do | Very dry, not set (72 hrs.). |
| Fine | do.[1] | 3% kieselguhr | Dry, moderately set (72 hrs.). |
| Coarse | do.[1] | do | Do. |
| Fine | do.[1] | 1% kieselguhr | Damp, moderately set (72 hrs.). |
| Coarse | do.[1] | do | Dry, moderately set (72 hrs.). |
| Fine | None | None | Dry, set hard (24 hrs.). |
| Coarse | do.[1] | do | Wet, slightly set (24 hrs.). |
| Fine | 1% 72-18-10 [1] | 5% pptd. magnesium carbonate | Dry, slightly set (24 hrs.). |
| Coarse | do.[1] | do | Do. |
| Do | do.[1] | 2.5% pptd. magnesium carbonate | Do. |

[1] Ratio expressing parts by weight of rosin-paraffin-petrolatum, respectively.

The data of Table 2 show that about 4% kieselguhr gives excellent results, although amounts as low as 1% have been found satisfactory. Either fine or coarse grades of ammonium nitrate may be used. It will be seen from Table 2 that other porous, low-density, water-insoluble inorganic materials, such as precipitated magnesium carbonate, also confer antisetting qualities comparable to kieselguhr.

With reference to the foregoing tables, it will be seen that the composition of the coating may be varied without loss of its improved properties with respect to setting. Satisfactory coatings are formed by mixtures containing from about 30 to about 80 parts by weight of rosin, from about 5 to about 25 parts by weight of paraffin, and from about 50 to about 5 parts by weight of petrolatum.

In the tests ammonium nitrate treated with not more than 4% coating mixture and not more precipitated aluminum hydroxide, known to the trade as "light aluminum hydrate," are examples of such materials. Proprietary products, such as Snow Floss, Super Floss, Celite, and Dicalite, which are refined kieselguhrs, are very satisfactory. This material should be in such a finely-divided state that substantially all will pass through a 100-mesh screen, and preferably, in the case of kieselguhr, a major proportion should be capable of passing through a 325-mesh screen.

This invention has been found to be applicable to both fine and coarse grades of ammonium nitrate. By fine-grade ammonium nitrate is meant ammonium nitrate of a particle size such that the major proportion passes through a 60-mesh screen and substantially 10% to 25% thereof passes through a 100-mesh screen. By coarse-grade ammonium nitrate is meant ammonium nitrate of particle size such that the major proportion passes through a 20-mesh screen and is held on a 60-mesh screen, with substantially none passing through a 100-mesh screen.

In the method of the invention, the coating is added to granular ammonium nitrate at a temperature above the melting point of the coating mixture. This temperature is in the range of from about 200° to about 230° F. The coated ammonium nitrate is then cooled to the point where the coating becomes tacky, usually at from about 120° to about 190° F. Then the porous, low-density water-insoluble inorganic material is added, and cooling is preferably continued until the coating is hardened. This stage is reached at a temperature in the order of 150° F. However, the coated granular ammonium nitrate intimately mixed with kieselguhr may be discharged at temperatures as high as about 190° F. in order to expedite production. The entire operation may be carried out conveniently in an agitated mixer, such as a large kettle equipped with rotating plows, from which the granular coated mass may be discharged when the coating has hardened. Alternatively, the kieselguhr may be applied immediately after the coating, hence at about 10° below the coating temperature.

It is contemplated that other salts may be substituted for part of the ammonium nitrate. For example, phosphate rock, superphosphate, potassium nitrate, or like suitable plant foods may be mixed with the ammonium nitrate in limited proportions before coating. It has been found that cograining of the ammonium nitrate with about 5% of ammonium sulfate or potassium nitrate yields a very satisfactory product. Likewise, substitution of phosphate rock or potassium nitrate for amounts up to about 1% of the kieselguhr gives very satisfactory results.

During storage and shipping, ammonium nitrate is often subjected to unfavorable conditions, such as increased pressure, high humidity or the presence of moisture, and temperature fluctuations. These conditions cause a slight solution at the surface of the granules. When the temperature is later reduced, some of the ammonium nitrate solidifies from this solution, tending to cement the particles together and thus causing caking.

Ammonium nitrate prepared in accordance with the invention is especially adaptable for use as a fertilizer because of its high available nitrogen content and its free-flowing property which enables the ammonium nitrate to be readily applied to the soil. Further, it is necessary to add but a relatively small amount of diluting materials, so that the ammonium nitrate is kept well within the limitation of 7% for diluents, as required of commercial ammonium nitrate plant food; and the diluting materials are not detrimental to the soil.

Although the prevention of caking, or setting, of ammonium nitrate is in itself a significant advantage, an additional advantage resides in the partial resistance of the ammonium nitrate particles to water penetration when placed in the soil. This partial resistance prevents an extensive loss of the ammonium nitrate through too rapid leaching, and thereby greater quantities of the material are retained as available plant food.

Where in the specification and appended claims the term "natural resin" is used, it is meant to include resins derived from trees, modified resins derived from trees, and blends thereof, compatible with paraffin and petrolatum.

What we claim and desire to protect by Letters Patent is:

1. An ammonium nitrate composition having improved resistance to caking comprising granular ammonium nitrate coated with a small proportion of a mixture of natural resin, paraffin, and petrolatum, said mixture containing from about 30 to about 80 parts of resin, from about 5 to about 25 parts of paraffin, and from about 50 to about 5 parts of petrolatum, in intimate mixture with a small proportion of a porous, low-density, water-insoluble inorganic material.

2. An ammonium nitrate composition having improved resistance to caking comprising granular ammonium nitrate coated with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum, in intimate mixture with not more than 10% by weight of a porous, low-density, water-insoluble inorganic material.

3. An ammonium nitrate composition having improved resistance to caking comprising granular ammonium nitrate coated with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum, in intimate mixture with not more than 10% by weight of kieselguhr capable of passing a screen in the order of 100 mesh.

4. An ammonium nitrate composition having improved resistance to caking comprising granular ammonium nitrate coated with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum, in intimate mixture with not more than 10% by weight of precipitated magnesium carbonate capable of passing a screen in the order of 100 mesh.

5. An ammonium nitrate composition having improved resistance to caking comprising granular ammonium nitrate coated with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum, in intimate mixture with not more than 10% by weight of precipitated aluminum hydroxide capable of passing a screen in the order of 100 mesh.

6. A method of making an ammonium nitrate composition having improved resistance to caking comprising coating granular ammonium nitrate with a mixture of natural resin, paraffin, and petrolatum; said mixture containing from about 30 to about 80 parts of resin, from about 5 to about 25 parts of paraffin, and from about 50 to about 5 parts of petrolatum, and intimately mixing a small proportion of a porous, low-density, water-insoluble inorganic material with the coated granular ammonium nitrate.

7. A method of making an ammonium nitrate composition having improved resistance to caking comprising coating granular ammonium nitrate with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum; cooling the coated granular ammonium nitrate until the coating thereof becomes tacky; and intimately mixing not more than 10% by weight of a porous, low-density, water-insoluble inorganic material with the coated granular ammonium nitrate.

8. A method of making an ammonium nitrate composition having improved resistance to caking comprising coating granular ammonium nitrate at a temperature of from about 200 to about 230° F. with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum; cooling the coated granular ammonium nitrate to a temperature of from about 120 to about 190° F.; and intimately mixing not more than 10% by weight of kieselguhr, capable of passing a screen in the order of 100 mesh, with the coated granular ammonium nitrate.

9. A method of making an ammonium nitrate composition having improved resistance to caking comprising coating granular ammonium nitrate at a temperature of from about 200 to about 230° F. with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum; cooling the coated granular ammonium nitrate to a temperature of from about 120 to about 190° F.; and intimately mixing not more than 10% by weight of precipitated magnesium carbonate, capable of passing a screen in the order of 100 mesh, with the coated granular ammonium nitrate.

10. A method of making an ammonium nitrate composition having improved resistance to caking comprising coating granular ammonium nitrate at a temperature of from about 200 to about 230° F. with not more than 4% by weight of a mixture of rosin, paraffin, and petrolatum, said mixture containing from about 30 to about 80 parts of rosin, from about 5 to about 25 parts of paraffin, and from about 50 to about 5 parts of petrolatum; cooling the coated granular ammonium nitrate to a temperature of from about 120 to about 190° F.; and intimately mixing not more than 10% by weight of precipitated aluminum hydroxide, capable of passing a screen in the order of 100 mesh, with the coated granular ammonium nitrate.

CORNELL H. CORDIE.
ROBERT W. LAWRENCE.